(12) United States Patent
Kawana

(10) Patent No.: US 10,503,096 B2
(45) Date of Patent: Dec. 10, 2019

(54) PRINTING APPARATUS THAT MANAGES INFORMATION RELATED TO A CONSUMABLE ITEM, CONTROL METHOD, AND STORAGE MEDIUM

(71) Applicant: CANON KABUSHIKI KAISHA, Tokyo (JP)

(72) Inventor: Yoshimasa Kawana, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/126,539

(22) Filed: Sep. 10, 2018

(65) Prior Publication Data

US 2019/0094750 A1 Mar. 28, 2019

(30) Foreign Application Priority Data

Sep. 26, 2017 (JP) ................. 2017-185483

(51) Int. Cl.
*G03G 15/00* (2006.01)
*G03G 15/08* (2006.01)
(Continued)

(52) U.S. Cl.
CPC ..... *G03G 15/0856* (2013.01); *G03G 15/0863* (2013.01); *G03G 15/105* (2013.01);
(Continued)

(58) Field of Classification Search
CPC .......... G03G 15/0856; G03G 15/0863; G03G 21/1875; G03G 21/1882; G03G 21/1889; G03G 21/1892
(Continued)

(56) References Cited

U.S. PATENT DOCUMENTS 8,611,766 B2 * 12/2013 Kawai ................ G03G 15/5079
399/12
8,655,200 B2 2/2014 Kawai
(Continued)

FOREIGN PATENT DOCUMENTS

JP 2003043901 A 2/2003
JP 2011197293 A 10/2011

OTHER PUBLICATIONS

Extended European Search Report issued in European Appln. No. 18190408.7 dated Mar. 27, 2019.

*Primary Examiner* — William J Royer
(74) *Attorney, Agent, or Firm* — Rossi, Kimms & McDowell LLP

(57) ABSTRACT

Identification information of a toner bottle recorded in an IC chip is included in a toner bottle. When information on remaining amount of toner is successful, a printing apparatus notifies a management server with identification information of the toner bottle and information on remaining amount of toner, obtains toner usage amount used in printing processing according to an execution of printing processing based on print job, and updates information on remaining amount recorded in the IC chip according to usage amount. When reading of information of the IC chip fails, updating of information on remaining amount recorded in the IC chip, according to usage amount of toner used in printing processing according to execution of printing processing based on print job, which is received when the reading fails, is suppressed. Notification including information indicating the reading has failed as the information on remaining amount is transmitted.

18 Claims, 5 Drawing Sheets

(51) Int. Cl.
*G06F 9/54* (2006.01)
*G03G 15/10* (2006.01)

(52) U.S. Cl.
CPC ......... *G03G 15/553* (2013.01); *G03G 15/556* (2013.01); *G06F 9/542* (2013.01); *G03G 2215/0888* (2013.01)

(58) Field of Classification Search
USPC .............................................. 399/8, 12, 27
See application file for complete search history.

(56) References Cited

U.S. PATENT DOCUMENTS

| | | | |
|---|---|---|---|
| 8,805,212 B2* | 8/2014 | Mimura | G03G 15/0863 399/12 |
| 2017/0126925 A1 | 5/2017 | Sasaki | |

* cited by examiner

PRINTING APPARATUS THAT MANAGES INFORMATION RELATED TO A CONSUMABLE ITEM, CONTROL METHOD, AND STORAGE MEDIUM

BACKGROUND OF THE INVENTION

Field of the Invention

The present invention relates to a printing apparatus, a control method, and a storage medium.

Description of the Related Art

Conventionally, the price per image formation determined in the contract between a sales company and a customer in selling a printing apparatus is determined by estimating a total amount of a toner used or a total number of consumable items replaced. Therefore, in a case where the toner attached to the printing apparatus is discarded part way through without being used up to the end, it is impossible to obtain the profit expected by the sales company.

With respect to this, efforts have been made such that the toner is used up to the end by displaying a message or the like on the printing apparatus. In addition, an IC chip has been attached to a toner bottle so that the sales company can correctly manage a usage situation of the toner bottle. In the IC chip, a serial ID of the toner bottle and an amount of a toner remaining amount in the bottle are recorded.

Japanese Patent Laid-Open No. 2011-197293 discloses a printing apparatus in which a toner cartridge is automatically delivered from a management device by notifying the management device of information indicating generation of a near empty region where the remaining amount of the toner in the toner cartridge is about to run out.

Normally, in a case where a consumable item such as a toner bottle is replaced, the printing apparatus initializes the remaining toner amount of a new toner bottle as 100%, and starts a management of the remaining toner amount. However, in the printing apparatus as described above, in a case where the toner bottle is replaced, information on the remaining toner amount from the IC chip is read, and the remaining toner amount is initialized using the read information on the remaining amount.

However, the information of the IC chip may not be able to be acquired due to a positional deviation between a sensor that reads information on the IC chip of the printing apparatus and the IC chip of the toner bottle, occurrence of electrical noise, or the like. At this time, since the printing apparatus is not able to initialize the remaining toner amount using the read information on the remaining amount, for example the initial value of the remaining toner amount may be initialized to a value different from the actual value, such as 100%. In addition, meanwhile, a notification for prompting the user to reinstall the toner bottle is performed for the user.

In such a state, in a case where a print job is received, the printing apparatus subtracts a toner usage amount used in the print job from the remaining toner amount initialized by using the value different from the actual value and calculates the latest remaining toner amount. Therefore, there is a possibility that the latest remaining toner amount may be a wrong value different from the actual remaining toner amount. In addition, in cases where the information of the IC chip is normally read such as during performance of re-installation of the toner bottle by the user, the information on the remaining amount of the IC chip may be updated with a wrong value different from the actual remaining toner amount.

SUMMARY OF THE INVENTION

The present invention provides a printing apparatus capable of suitably controlling writing to a storage device in a case where information on the remaining amount is not correctly read from the storage device included in a consumable item.

A printing apparatus according to an exemplary embodiment of the present invention is a printing apparatus equipped with a consumable item including a recording agent used in the printing apparatus. The printing apparatus comprises a memory storing instructions and a processor executing the instructions causing the printing apparatus to: read identification information of the consumable item recorded in a storage device included in the installed consumable item and information on a remaining amount of the recording agent; transmit a notification including the identification information of the consumable item and the information on the remaining amount of the recording agent to the outside in a case where the reading of the information of the storage device included in the installed consumable item is successful; and obtain a usage amount of the recording agent used in printing processing according to execution of the printing processing based on a print job and update the information on the remaining amount recorded in the storage device included in the installed consumable item according to the usage amount, wherein, in a case where the reading of the information of the storage device included in the installed consumable item fails, the updating of the information on the remaining amount recorded in the storage device included in the consumable item, according to the usage amount of the recording agent used in the printing processing according to the execution of the printing processing based on the print job, which is received when the reading fails, is suppressed, and wherein, in a case where the reading of the information of the storage device included in the installed consumable item fails, a notification including information indicating that the reading has failed as the information on the remaining amount is transmitted.

Further features of the present invention will become apparent from the following description of exemplary embodiments (with reference to the attached drawings).

DESCRIPTION OF THE EMBODIMENTS

Hereinafter, an exemplary embodiment for implementing the present invention will be described with reference to the drawings and the like.

First Exemplary Embodiment

Figure 1:
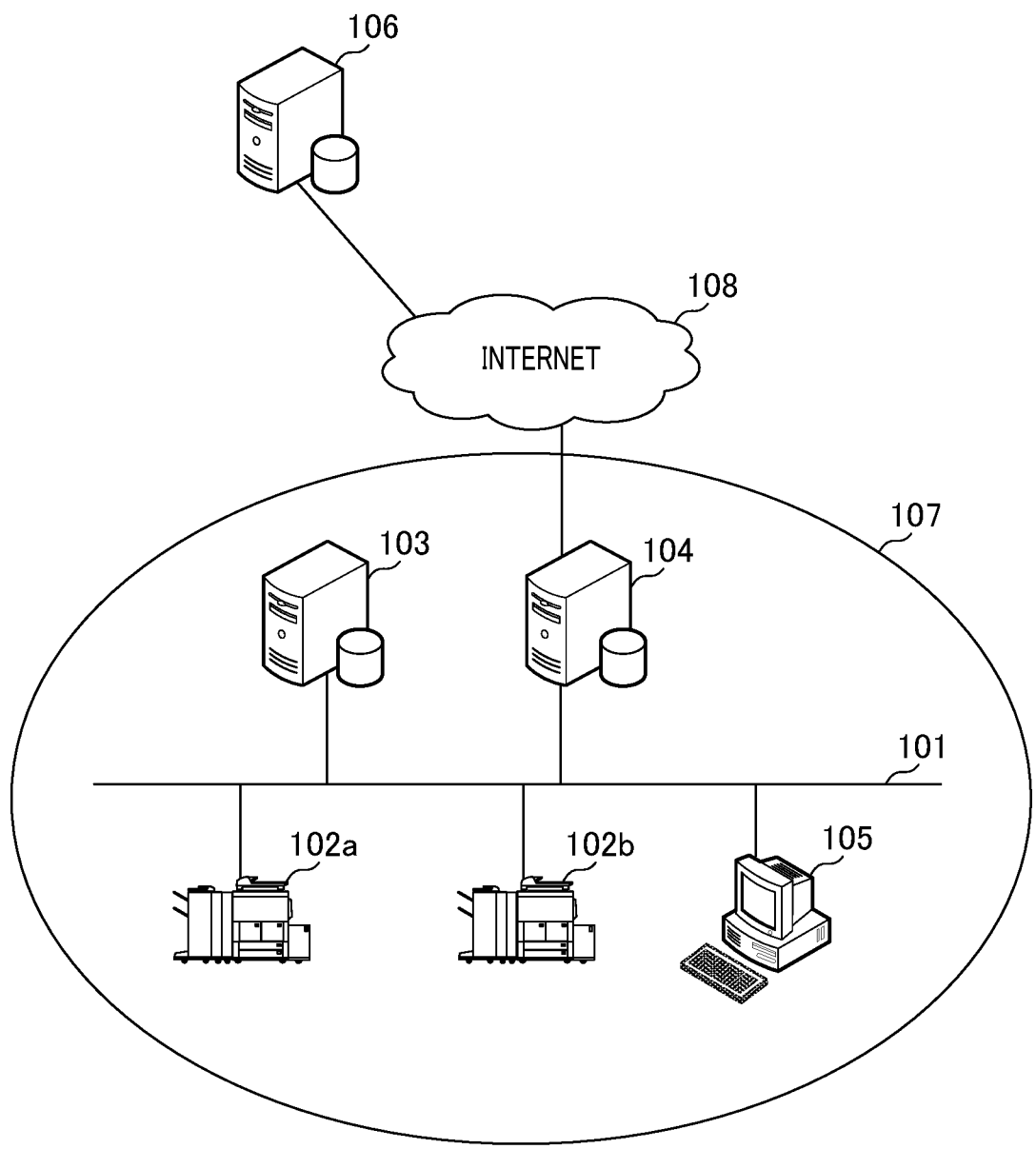
FIG. 1 is a diagram illustrating an overall configuration example of a management system according to an exemplary embodiment of the present invention.

FIG. 1 is a diagram illustrating an overall configuration example of a management system according to an exemplary embodiment of the present invention. In FIG. 1, printing apparatuses 102a and 102b, a proxy server 103, a firewall 104, and a personal computer (PC) 105 are mutually connected by a LAN 101.

In addition, in the description, matters common to the printing apparatuses 102a and 102b will be described as a printing apparatus 102. In FIG. 1, it is shown that two printing apparatuses 102 are connected to the LAN 101 and a plurality of printing apparatuses 102 are installed under an environment of the same customer, but the present invention is not limited thereto, and one printing apparatus may be provided or a plurality of printing apparatuses may be provided.

In addition, in the present exemplary embodiment, the printing apparatus 102 is described as an apparatus (an image forming apparatus) that forms an image on paper using a recording agent such as a toner or an ink, but the present invention is not limited thereto. For example, the printing apparatus 102 may be an apparatus that forms a three-dimensional object using the recording agent such as a molding material, such as a so-called 3D printer. In addition, in a case where the printing apparatus 102 is an image forming apparatus, the printing apparatus 102 may be an image forming apparatus having a complex function of a FAX, a copy, and the like.

The proxy server 103 enables a plurality of users to connect to the Internet 108 from a protocol such as HTTP or HTTPS from an intranet 107. The firewall 104 is installed to increase the security of the intranet 107. The PC 105 is one used by a general user for business or the like and includes hardware resources and software resources, and an OS included in the software resources controls an execution or the like of an application.

A management server 106 centrally manages an operation state of the printing apparatus 102. For example, the management server 106 collects operation information of the printing apparatus 102, detects a problem in the printing apparatus 102, and the like. Further, for example, the management server 106 manages an inventory situation at a client site regarding consumable supplies for the printing apparatus 102 which is managed, and automatically arranges delivery of new consumable supplies to customers as necessary. Here, the consumable item is generally a consumable material such as a toner, ink, a paper, and a molding material, a toner bottle, a toner cartridge, an ink tank, an ink bottle, an ink cartridge, a replacement part, or the like.

The intranet 107 corresponds to an environment in which the printing apparatus 102, the proxy server 103, and the firewall 104 are mutually connected by the LAN 101. In practice, a plurality of intranet environments and the management server 106 are connected to each other so as to communicate with each other through the Internet 108.

Figure 2:
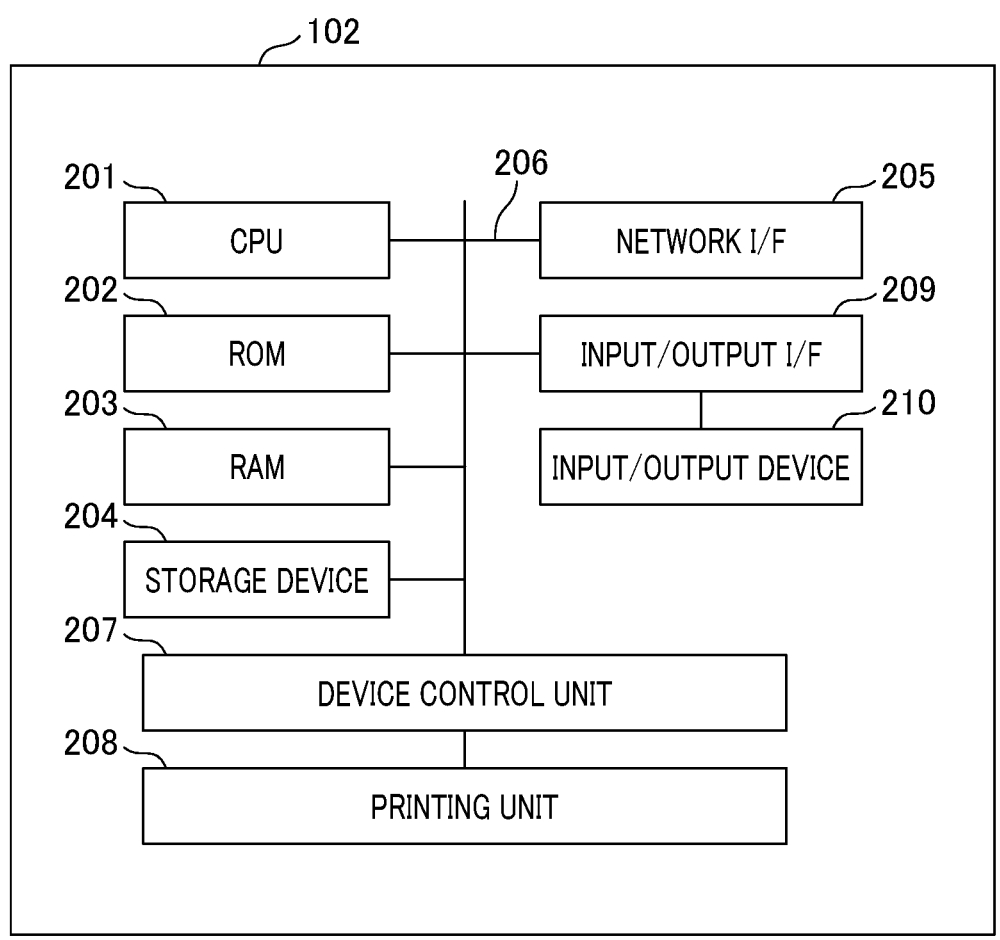
FIG. 2 is a diagram illustrating a hardware configuration example of a printing apparatus.

FIG. 2 is a diagram illustrating a hardware configuration example of the printing apparatus 102.

The printing apparatus 102 includes a CPU 201, a ROM 202, a RAM 203, a storage device 204, a network I/F 205, an internal bus 206, a device control unit 207, a printing unit 208, an input/output I/F 209, an input/output device 210, and the like.

The CPU 201 comprehensively controls each device through the internal bus 206. The CPU 201, the ROM 202, the RAM 203, the storage device 204, the network I/F 205, the device control unit 207, the input/output I/F 209, and the like are connected to the internal bus 206. A program is stored in the ROM 202. The program includes a program realizing a software configuration of FIG. 3 that will be described later.

The RAM 203 functions as a memory or a work area of the CPU 201. The CPU 201 executes the program together with the ROM 202 or the RAM 203 and records image data in a recording medium such as the storage device 204. The storage device 204 functions as an external storage device. In addition to the storing the image data and the like, the storage device 204 is able to store counter information, system information, various logs instead of the backup RAM 203.

The network I/F 205 exchanges data with an external network device or a PC through the LAN 101 in a one way manner or a two way manner. The device control unit 207 controls the printing unit 208. For example, the printing unit 208 may be a printing unit using an electronic photographic method and include an exposure unit, a transfer unit, a fixing unit, and the like. The input/output device 210 indicates a plurality of configurations responsible for inputting and outputting in the printing apparatus 102.

Specifically, an input (an input with a button or the like) from the user is received, and a signal corresponding to the input is transferred to each processing unit described above by the input/output I/F 209. In addition, the input/output device 210 includes a display unit or a display device (a touch panel or the like) for providing necessary information to the user or receiving a user operation. In addition, a scan device for reading a document and receiving electronic data as the input may also be included in the input/output device 210.

Figure 3:
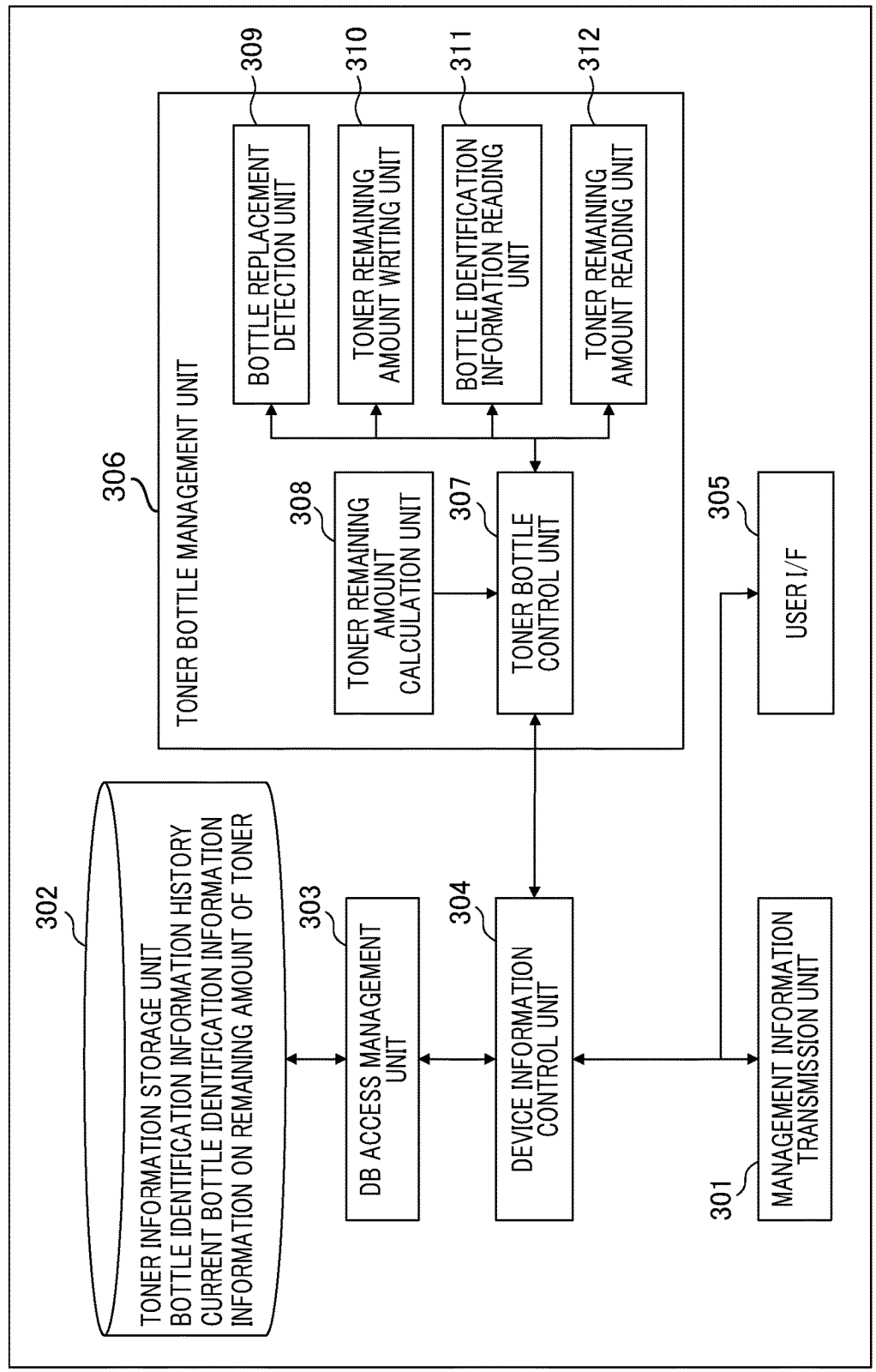
FIG. 3 is a diagram illustrating a software configuration example of the printing apparatus.

FIG. 3 is a diagram illustrating a software configuration example of the printing apparatus 102.

In FIG. 3, a software configuration executing control related to management of the toner bottle is mainly shown, and other configurations will be omitted. The printing apparatus 102 includes a management information transmission unit 301, a toner information storage unit 302, a database (DB) access management unit 303, a device information control unit 304, a user IF 305, a toner bottle management unit 306, and the like.

The management information transmission unit 301 transmits information on the printing apparatus 102 (device information), information on an event (event information) generated in the printing apparatus 102, various kinds of counter information, consumption degree information of the consumable item, and the like to the management server 106. The device information includes identification information (a serial ID) of the printing apparatus 102, network information (an IP address), operation information, and the like, and any piece of information is used in a notification or the like according to the need.

The transmission of the event information to the management server 106 is started after a communication test with the management server 106 is performed during a sequence of installation work when the printing apparatus 102 is installed at the customer site. In addition, the management information transmission unit 301 receives various instructions, setting data, and the like transmitted from the management server 106. In addition, transmission and reception of the above-described various pieces of data are performed using a protocol such as an SMTP or HTTP/HTTPS.

The toner information storage unit 302 stores a history of the identification information of a used toner bottle and the identification information of a currently installed toner bottle after the printing apparatus 102 is installed at the site of the customer. In addition, the toner information storage unit 302 stores information on a remaining amount of the toner of the currently installed toner bottle, information on the remaining amount of the toner at the time of a removal of a previously installed and removed toner bottle, and the like.

The information on the remaining amount of the toner includes a remaining amount of toner. Details of the information on the remaining amount of the toner will be described with reference to Table 2. In addition, the toner information storage unit 302 manages times such as a time when the toner bottle becomes empty or a time when the toner bottle is replaced and the counter information, and the like at that time in association with the information on the remaining amount of the toner at that time.

In addition, the toner information storage unit 302 stores other pieces of management information necessary for the management of the printing apparatus 102. Specifically, for example, the management information includes device configuration information such as firmware information or the identification information of the printing apparatus 102, various kinds of counter information, the consumption degree information of the consumable item, the operation history of the printing apparatus 102, history information (log data) representing various abnormal states, or the like.

In addition, for example, the management information includes the above-described device information or the information on the management server 106 (server information). The server information includes information used in the communication with the management server 106, such as address information of the management server 106 that manages the printing apparatus 102. The toner information storage unit 302 records the above-described various kinds of information in the ROM 202, the RAM 203, the storage device 204, and the like. Hereinafter, an example of the data stored in the toner information storage unit 302 is shown.

The description is returned to the description of FIG. 3. The DB access management unit 303 performs storage control such as storage of the information in the toner information storage unit 302 or reading the information from the toner information storage unit 302. The device information control unit 304 performs print control, management of an abnormal state of the printing apparatus 102, or the like, and also performs management of the counter information, management of the notification information, or the like. For example, the counter information may be a value obtained by counting the number of printed sheets printed by the printing apparatus 102 using a sensor or the like, or information indicating the consumption degree of a consumable item.

In addition, the device information control unit 304 communicates with a toner bottle control unit 307 of the toner bottle management unit 306 and receives the identification information or the information on the remaining amount of the toner bottle stored in the IC chip in a case where a new toner bottle is installed. In addition, the device information control unit 304 transmits the received identification information or information on the remaining amount of the toner bottle to the DB access management unit 303 and makes a storage request to the toner information storage unit 302.

In addition, in a case where the toner bottle is replaced, the device information control unit 304 transmits the information on the remaining amount of the toner and the counter value recorded at the removal time together with the identification information of the removed toner bottle to the management server 106 through the management information transmission unit 301. In addition, the device information control unit 304 transmits the information on the

TABLE 1

| Time | Toner bottle serial ID (identification information) | Remaining amount in bottle | Action | Notification | Counter value |
| --- | --- | --- | --- | --- | --- |
| 2017 Jun. 15 10:15:21 | AFB39561-016 | 100% | Installed | Completion | 513 |
| 2017 Jun. 28 14:50:36 | AFB39561-016 | 5% | Removed | Completion | 8630 |
| 2017 Jun. 28 14:52:12 | CCA48592-057 | 100% | Installed | Completion | 8630 |
| 2017 Jul. 10 16:46:44 | CCA48592-057 | 6% | Removed | Completion | 15439 |
| 2017 Jul. 10 16:48:11 | Unknown (TMP10293-001) | Unknown | Installed | Completion | 15439 |

Table 1 shows an example of the data (toner information) related to the toner stored in the toner information storage unit 302.

The toner information includes the time, the toner bottle serial ID, the remaining amount in the bottle, the action, the notification, and the counter value. A data writing time is recorded in the time. The identification information (the serial ID) for uniquely identifying the toner bottle is recorded in the toner bottle serial ID.

The information on the remaining amount of the toner of the toner bottle at the time when an action such as installation or removal of the toner bottle is performed is recorded in the remaining amount in bottle. Information on whether the toner bottle is installed or has been removed is recorded in the action. Information on whether or not recorded event information has already been notified to the management server 106 is recorded in the notification. A counter value when the recorded event is generated is recorded in the counter value.

remaining amount of the toner read from the IC chip of the installed toner bottle and the counter value at that time together with the identification information of the newly installed toner bottle to the management server 106 through the management information transmission unit 301.

Therefore, a sales company can track how much toner has been used and in which printing apparatus 102 from a start to an end of a use of the toner bottle. In a case where the information on the toner bottle is not able to be read from the IC chip included in the toner bottle when the toner bottle is replaced, temporary identification information is issued with respect to the installed toner bottle and the identification information, the information on the remaining amount of the toner, and the counter value are managed similarly to a case where the information is read.

The user IF 305 is an interface that enables instruction of an operation to the printing apparatus 102. For example, the operation instruction may be a print instruction or the like.

In addition, the user IF 305 may display state information of the printing apparatus 102, the consumption degree information of various consumable items including the information on the remaining amount of the toner, setting information, and the like.

For example, in a case where the information on the remaining amount of the toner is not able to be successfully read from the IC chip of the installed toner bottle, the user IF 305 displays a message with a content such as "The toner bottle information could not be read. Please install the toner bottle again." In addition, for example, in a case where the IC chip of the installed toner bottle has a problem, the user IF 305 displays a message with content such as "The toner bottle has a problem. Please install a new toner bottle."

The toner bottle management unit 306 controls management of attachment and detachment of the toner bottle in the printing apparatus 102 and reading and writing of information from and to the IC chip included in the toner bottle. In addition, the toner bottle management unit 306 performs management of an estimated remaining amount of the toner. The toner bottle management unit 306 includes the toner bottle control unit 307, a toner remaining amount calculation unit 308, a bottle replacement detection unit 309, a toner remaining amount writing unit 310, a bottle identification information reading unit 311, and a toner remaining amount reading unit 312.

The toner bottle control unit 307 is a central control unit in the toner bottle management unit 306. The toner bottle control unit 307 performs predetermined processing when the toner bottle is removed or installed, when a notification is to be transmitted to a customer, and the like, and performs an instruction for notifying the management server 106 of the event information.

The toner remaining amount calculation unit 308 calculates a toner usage amount used in the printing processing in a case where the printing apparatus 102 uses the toner due to performing printing processing. In addition, the toner remaining amount calculation unit 308 obtains the information on the remaining amount of the toner at this time from the toner information storage unit 302 through the toner bottle control unit 307 and the device information control unit 304. The toner remaining amount calculation unit 308 obtains the latest information on the remaining amount of the toner by subtracting the calculated usage amount from the acquired information on the remaining amount of the toner.

The calculated latest information on the remaining amount of the toner is transmitted to the toner information storage unit 302 through the toner bottle control unit 307 and the device information control unit 304, and the information on the remaining amount of the toner is updated. In addition, in order to update the information on the remaining amount recorded by the IC chip of the toner bottle using the information on the remaining amount of the toner calculated by the toner remaining amount calculation unit 308, the toner bottle control unit 307 instructs the toner remaining amount writing unit 310 to write the remaining amount of the toner.

The toner remaining amount writing unit 310 writes the latest information on the remaining amount of the toner into the IC chip included in the toner bottle according to the received remaining amount of the toner writing instruction. As described above, in a case where the toner is used in the printing apparatus 102, the information on the remaining amount of the toner is calculated every time the toner is used, and the calculated latest information on the remaining amount of the toner is recorded in the IC chip of the toner bottle. In addition, the calculated information on the remaining amount of the toner may be displayed on the input/output device 210 of the printing apparatus 102 every time the toner is used.

In a case where the bottle replacement detection unit 309 detects that the toner bottle has been removed from the printing apparatus 102, the bottle replacement detection unit 309 notifies the toner bottle control unit 307 of the identification information of the removed toner bottle and information indicating that the toner bottle has been removed. In a case where the toner bottle control unit 307 receives the notification from the bottle replacement detection unit 309, the toner bottle control unit 307 notifies the device information control unit 304 of the removal of the toner bottle from the printing apparatus 102.

The device information control unit 304 acquires the information on the remaining amount of the toner of the removed toner bottle from the toner information storage unit 302 through the DB access management unit 303 and notifies the management information transmission unit 301 of the information on the remaining amount of the toner of the removed toner bottle. The management information transmission unit 301 notifies the management server 106 of the identification information of the removed toner bottle and the information on the remaining amount of the toner at the time of the removal together with the information indicating that the toner bottle has been removed.

In addition, in a case where the bottle replacement detection unit 309 detects that the toner bottle is installed in the printing apparatus 102, the bottle replacement detection unit 309 notifies the toner bottle control unit 307 of information indicating that the toner bottle is installed. In a case where the toner bottle control unit 307 receives the notification from the bottle replacement detection unit 309, the toner bottle control unit 307 instructs the bottle identification information reading unit 311 to read the identification information of the installed toner bottle.

In addition, in a case where the toner bottle control unit 307 receives the notification from the bottle replacement detection unit 309, the toner bottle control unit 307 instructs the toner remaining amount reading unit 312 to read the information on the remaining amount of the toner of the installed toner bottle. Each of the bottle identification information reading unit 311 and the toner remaining amount reading unit 312 receiving the reading instruction reads the identification information of the toner bottle and the information on the remaining amount of the toner from the IC chip included in the toner bottle and notifies the toner bottle control unit 307 of the identification information of the toner bottle and the information on the remaining amount of the toner.

In a case where the toner bottle control unit 307 receives the notification from the bottle identification information reading unit 311 and the toner remaining amount reading unit 312, the toner bottle control unit 307 notifies the device information control unit 304 of the identification information of the toner bottle and the information on the remaining amount of the toner together with information indicating that the new toner bottle is installed. In a case where the device information control unit 304 receives the notification, the device information control unit 304 stores the identification information of the installed toner bottle and the information on the remaining amount of the toner in the toner information storage unit 302 through the DB access management unit 303.

Therefore, even in a case where the remaining amount of the toner is less than 100%, and for example, a toner bottle temporarily used in another printing apparatus 102 is installed, it is possible to initialize the information on the remaining amount of the toner with an accurate value. For example, in a case where the toner bottle of which the remaining amount of the toner is less than 100% is initialized as 100%, there is a possibility that a difference between the remaining amount actually remaining in the toner bottle and the current value calculated and managed by the remaining amount prediction will be generated.

In a case where the remaining amount of the toner of the installed toner bottle is equal to or less than a predetermined threshold value, the printing apparatus 102 notifies the management server 106 of a toner low alarm signal. However, in a case where such a difference as described above is generated, the notification to the management server 106 is delayed. For example, in a case where the management server 106 automatically delivers the consumable item by receiving the notification, when the notification is delayed, a timing of instructing the delivery is delayed, and thus there is a possibility that the consumable item does not arrive to the user at an appropriate timing.

However, according to the present exemplary embodiment, when the toner bottle is installed, the information on the remaining amount of the toner of the toner bottle is read and it is possible to initialize the information on the remaining amount of the toner managed by the printing apparatus 102 and the management server 106 with the accurate value. Therefore, it is possible to more accurately management the toner bottle in the printing apparatus 102 and the management server 106.

In addition, the device information control unit 304 also notifies the management information transmission unit 301 of the identification information of the installed toner bottle and the information on the remaining amount of the toner. The management information transmission unit 301 notifies the management server 106 of the identification information of the installed toner bottle and the information on the remaining amount of the toner at the time of the installation together with the information indicating that the toner bottle is installed.

In addition, in the process of acquiring the identification information of the toner bottle, in a case where the information is not able to be read from the IC chip, the bottle identification information reading unit 311 notifies the toner bottle control unit 307 of information indicating that the reading fails. In a case where the toner bottle control unit 307 is notified of the information indicating that the reading fails from the bottle identification information reading unit 311, the toner bottle control unit 307 issues temporary identification information of the toner bottle and manages the information on the remaining amount of the toner using the identification information.

In addition, in the process of acquiring the information on the remaining amount of the toner, in a case where the information is not able to be read from the IC chip, the toner remaining amount reading unit 312 notifies the toner bottle control unit 307 of the information indicating that the reading fails. In a case where the toner bottle control unit 307 is notified of the information indicating that the reading fails from the toner remaining amount reading unit 312, the toner bottle control unit 307 manages the information on the remaining amount of the toner by setting a code indicating that the reading of the information on the remaining amount fails as the information on the remaining amount.

In the present exemplary embodiment, for example, "FF" is used as the code indicating that the reading of the information on the remaining amount of the toner fails. In addition, in a case where the toner remaining amount reading unit 312 determines that the IC chip has a problem as a case where the reading of the information from the IC chip of the toner bottle fails, the toner remaining amount reading unit 312 notifies the toner bottle control unit 307 of information indicating that the reading fails due to the problem in the IC chip.

In a case where the toner bottle control unit 307 is notified of the information indicating that the reading fails due to the problem in the IC chip from the toner remaining amount reading unit 312, the toner bottle control unit 307 manages the information on the remaining amount of the toner by setting a code indicating that the IC chip has the problem as the information on the remaining amount. In the present exemplary embodiment, for example, "FE" is used as the code indicating that the IC chip has the problem.

As described above, the toner bottle includes the IC chip, and in a case where the toner is used by the printing apparatus 102, the latest information on the remaining amount of the toner is recorded in the IC chip of the toner bottle. Therefore, even in a case where the toner bottle is used by a plurality of printing apparatuses 102, it is possible to appropriately grasp the remaining amount of the toner of the toner bottle. In addition, the sales company can appropriately manage the toner and toner bottle consumable items through the management server 106 even though the sales company is remote from the printing apparatus 102.

In addition, in a case where the toner bottle control unit 307 sets "FF" or "FE" as the information on the remaining amount of the toner, that is, the code indicating that the reading of the information from the IC chip fails, the toner bottle control unit 307 does not write the information on the remaining amount in the IC chip and suppresses the updating of the information of the IC chip. Details of the processing of updating the information of the IC chip will be described later with reference to FIGS. 4A and 4B.

In addition, when "FF" or "FE" is set as the information on the remaining amount of the toner, in a case where the remaining amount of the toner becomes zero, that is, the toner in the toner bottle is exhausted, the toner bottle control unit 307 performs the next processing. That is, the toner bottle control unit 307 records information indicating that the remaining amount of the toner is zero as the information on the remaining amount of the toner in the IC chip of the toner bottle. In addition, here, in a case where the information is not able to be written in the IC chip, particularly nothing is done. Hereinafter, an example of the data stored in the IC chip is shown.

TABLE 2

| | | |
|---|---|---|
| 1 | Format revision | 11.15a |
| 2 | The number of sheets from empty bottle to bottle replacement | 512 |
| 3 | Previous toner bottle serial ID | AFB39561-016 |
| 4 | Toner bottle serial ID | CCA48592-057 |
| 5 | Toner bottle insertion date | 2017 Jun. 28 |
| 6 | Toner bottle delivery instruction threshold value | 20 (%) |
| 7 | Toner bottle delivery instruction date | 2017 Jul. 4 |
| 8 | Toner bottle empty date | NULL |
| 9 | The number of sheets from previous empty bottle to empty bottle | NULL |
| 10 | The number of sheets from the present bottle usage time to now | 5525 |
| 11 | Estimated remaining amount of toner in bottle | 15 (%) |
| 12 | The present bottle average coverage | 0.08 (%) |
| 13 | Latest update date | 2017 Jul. 6 |
| 14 | Reserve region.1 | NULL |

TABLE 2-continued

| 15 Reserve region.2 | NULL |
| 16 Reserve region.3 | NULL |

Table 2 shows the example of the data (the toner information) related to the toner stored in the IC chip. In Table 2, the format revision of the toner information recorded in the IC chip is recorded in a first line. Even a case of a management of data of a new format, the printing apparatus 102 is able to appropriately use the data by the format revision.

The number of printed sheets from a time when the toner bottle is empty to a time when a next toner bottle is replaced is recorded in a second line. In this item, the recording is started after the toner bottle is empty and a counter of this item continues to be updated every time a print job is processed. Therefore, when the toner bottle is removed, a correct counter sheet number is recorded. A serial ID of the toner bottle that is installed prior to the toner bottle including the IC chip is recorded in a third line.

The serial ID of the toner bottle including the IC chip is recorded in a fourth line. A date when the toner bottle is installed to the printing apparatus 102 is recorded in a fifth line. A threshold value used when determining a timing at which a fact that the remaining amount of the toner is reduced is issued as an event is recorded in a sixth line. When the remaining amount of the toner becomes smaller than the threshold value, an event such as toner low is issued.

A date when the fact that the remaining amount of the toner is reduced is issued as the event is recorded in a seventh line. A date when the toner bottle is empty is recorded in an eighth line. The number of the printed sheets from a time when the toner bottle installed prior to the toner bottle including the IC chip is empty to a time when the toner bottle including the IC chip is empty in the printing apparatus 102 is recorded in a ninth line.

The number of the printed sheets from the time when the toner bottle is installed is recorded in a tenth line. The estimated remaining amount of the toner of the toner bottle is recorded in an eleventh line. An average toner usage amount per printed matter in the toner bottle is recorded in a twelfth line. A date when the IC chip is last updated is recorded in a thirteenth line. Fourteenth to sixteenth lines are reserve regions.

Figure 4A:
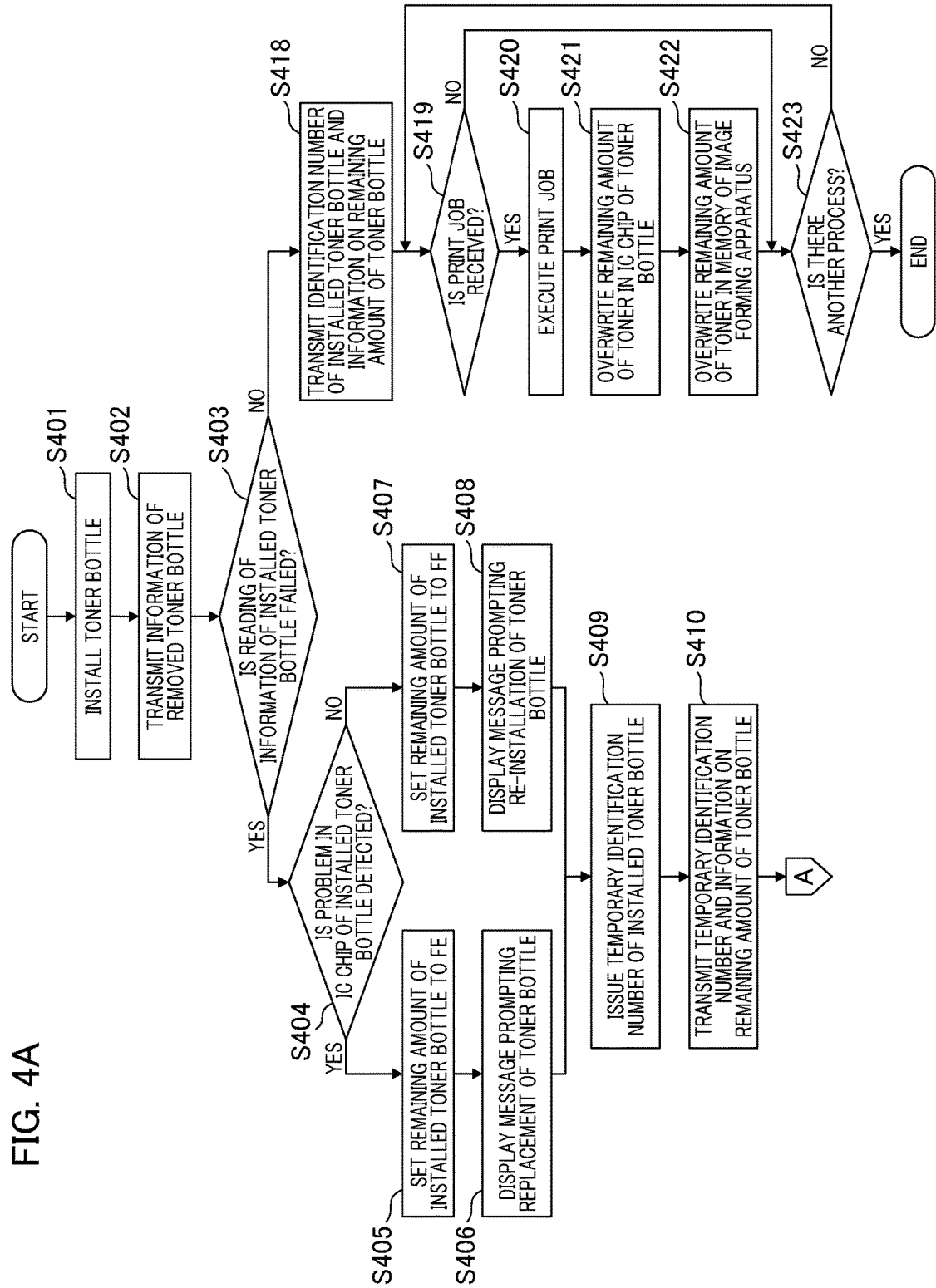
FIGS. 4A and 4B is a flowchart illustrating processing of updating information of an IC chip.
Figure 4B:
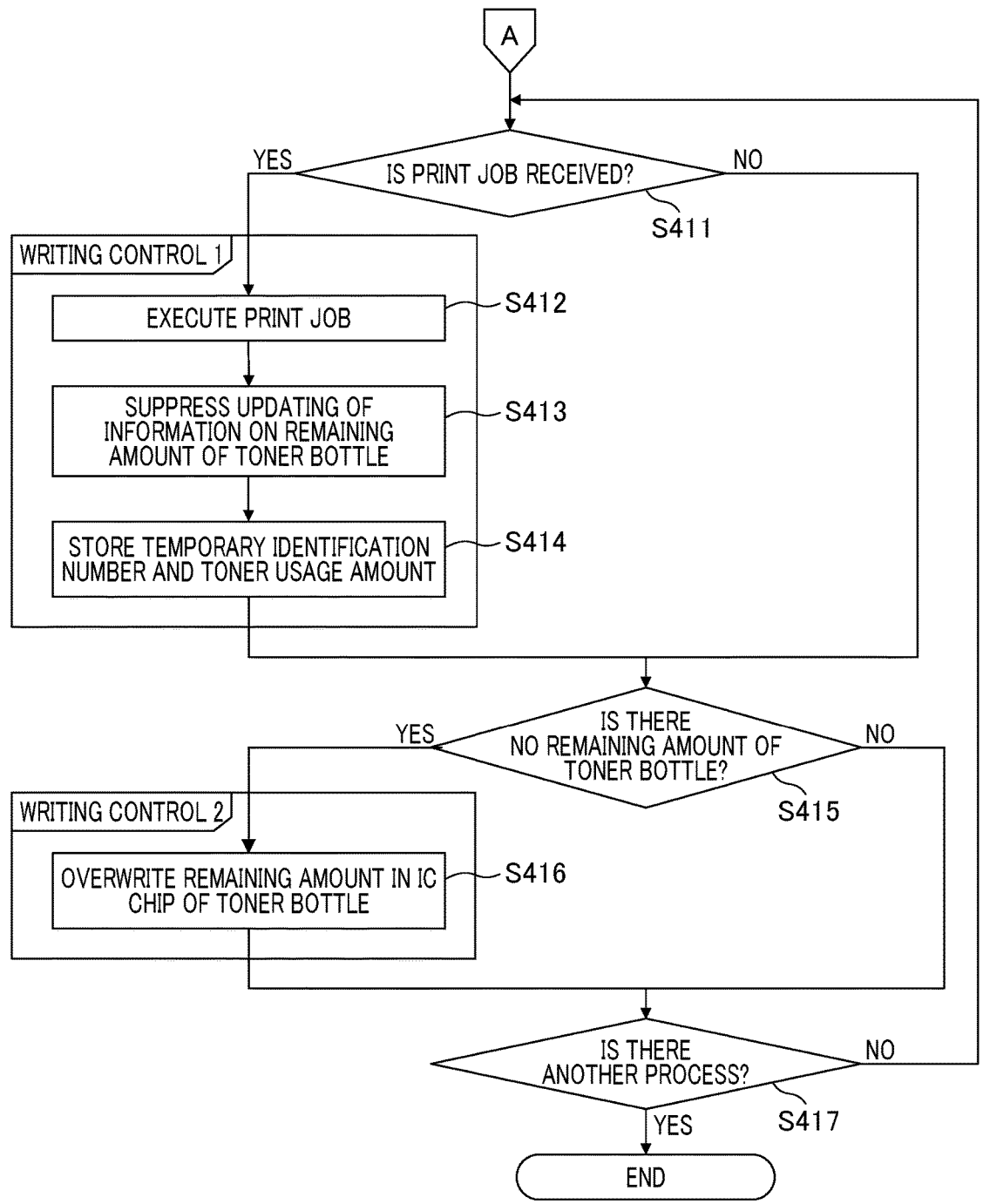

FIGS. 4A and 4B are flowcharts illustrating processing of updating the information of the IC chip included in the toner bottle.

The processing shown in FIGS. 4A and 4B are realized by the CPU 201 developing the program stored in the ROM 202 or the storage device 204 in the RAM 203 and executing the program. The user opens a cover of the printing apparatus 102 and replaces the toner bottle in order to replace the toner, and thus, the program is called up and the processing of FIG. 4A is started.

In step S401, in a case where the bottle replacement detection unit 309 detects that the toner bottle is installed in the printing apparatus 102, the bottle replacement detection unit 309 notifies the toner bottle control unit 307 of the information indicating that the toner bottle is installed. In step S402, the toner bottle control unit 307 receives the notification of the information indicating that the toner bottle is installed and notifies the device information control unit 304 of the information indicating that the toner bottle is installed.

In order to transmit the information of the removed toner bottle to the management server 106, the device information control unit 304 acquires the identification information of the removed toner bottle and the information on the remaining amount of the toner from the toner information storage unit 302 and notifies the management information transmission unit 301 of such pieces of the information. The management information transmission unit 301 receiving the notification transmits the identification information of the removed toner bottle and the information on the remaining amount of the toner to the management server 106.

In step S403, each of the bottle identification information reading unit 311 and the toner remaining amount reading unit 312 receives the instruction from the toner bottle control unit 307 and reads the identification information of the toner bottle and the information on the remaining amount of the toner from the IC chip of the installed toner bottle. In detail, the bottle identification information reading unit 311 reads a value of "toner bottle serial ID" in the fourth line of the information shown in Table 2 from the IC chip as the identification information of the toner bottle.

In addition, the toner remaining amount reading unit 312 reads a value of "estimated remaining amount of the toner in the bottle" of at least the eleventh line among the information shown in Table 2 from the IC chip as the information on the remaining amount of the toner. However, the present invention is not limited thereto and another piece of information may be read and used. Here, in a case where the reading of the information of one or both pieces of the identification information of the toner bottle and the information on the remaining amount of the toner fails, the processing proceeds to step S404, and in a case where the reading of the both pieces of the information is successful, the processing proceeds to step S418.

In step S404, the toner bottle control unit 307 determines whether the IC chip has the problem or the reading is just failed without the problem in the IC chip according to the reading result by the bottle identification information reading unit 311 or the toner remaining amount reading unit 312. Specifically, in a case where a data pattern that is not to be originally obtained or information that is out of regulation is acquired as the reading result, it is determined that the problem is detected, that is, the IC chip has the problem.

In addition, in a case where a part of the data is missing as the reading result, it is determined that the reading of the IC chip fails. In a case where the toner bottle control unit 307 determines that the IC chip has the problem, the processing proceeds to step S405, and in a case where the toner bottle control unit 307 determines that the IC chip does not have the problem, the processing proceeds to step S407. In step S405, the toner bottle control unit 307 sets the code ("FE") indicating that the IC chip has the problem as the information on the remaining amount of the toner of the installed toner bottle.

In step S406, the toner bottle control unit 307 notifies the device information control unit 304 of the information indicating that the IC chip has the problem as the information on the remaining amount of the toner. In a case where the device information control unit 304 receives the notification, the device information control unit 304 displays the message prompting the consumable item replacement through the user IF 305. For example, the user IF 305 displays a message of contents such as "Please install a new toner bottle because the toner bottle has problem."

On the other hand, in step S407, the toner bottle control unit 307 sets the code ("FF") indicating that the reading of the IC chip fails as the information on the remaining amount of the toner of the installed toner bottle. In step S408, the toner bottle control unit 307 notifies the device information control unit 304 of the information indicating that the reading of the IC chip fails.

In a case where the device information control unit 304 receives the notification, the device information control unit 304 displays a message prompting re-installation of the toner bottle through the user IF 305. For example, the user IF 305 displays a message of contents such as "Information of the toner bottle is not able to be read. Please install the toner bottle again."

In step S409, the toner bottle control unit 307 issues the temporary identification information to the installed toner bottle. In step S410, the toner bottle control unit 307 transmits the notification including the information indicating that the reading fails as the information on the remaining amount of the toner to the device information control unit 304. That is, the notification including the code such as "FF" or "FE" described above as the information on the remaining amount of the toner is transmitted. In addition, the notification includes the temporary identification information of the toner bottle.

The device information control unit 304 receiving the notification stores the identification information of the toner bottle and the information on the remaining amount of the toner included in the notification in the toner information storage unit 302 through the DB access management unit 303, and further transmits a notification similar to the notification to the management information transmission unit 301. The management information transmission unit 301 receiving the notification transmits the notification including the temporary identification information of the installed toner bottle and the information indicating that the reading fails as the information on the remaining amount of the toner to the management server 106.

In step S411, it is determined whether the device control unit 207 receives any print job. For example, in a case where a FAX is received by the printing apparatus 102 and it is necessary to print the FAX or a print request is performed through the LAN 101, it is determined that the device control unit 207 receives the print job.

As described above, according to the present exemplary embodiment, even in a case where the information of the IC chip of the toner bottle is not able to be read correctly, the printing apparatus 102 does not reject the print job and accepts the print job. In addition, writing control processing is performed on the IC chip in steps S412 to S414. In step S411, in a case where the device control unit 207 receives the print job, the processing proceeds to step S412, and in a case where the device control unit 207 does not receive the print job, the processing proceeds to step S415.

In step S412, the device control unit 207 performs a print instruction on the printing unit 208 and the printing unit 208 executes printing processing according to the instruction. In a case where the printing processing is completed, the processing proceeds to step S413. In step S413, the toner remaining amount calculation unit 308 calculates the toner usage amount used in the printing processing of step S412. In addition, the toner remaining amount calculation unit 308 acquires information on the remaining amount of the toner at that time from the toner information storage unit 302 through the toner bottle control unit 307 and the device information control unit 304.

In addition, at that time, "FF" or "FE" stored in step S410 is stored in the toner information storage unit 302 as the information on the remaining amount of the toner. Here, originally, in a case where the information is normally read from the IC chip, the latest information on the remaining amount of the toner is obtained by subtracting the toner usage amount by the current printing processing from the acquired information on the remaining amount of the toner. In addition, the information on the remaining amount of the toner stored in the IC chip and the toner information storage unit 302 is overwritten and updated by the obtained latest information on the remaining amount of the toner.

However, in a case where the information is not normally read from the IC chip and "FF" or "FE" is acquired as the information on the remaining amount of the toner, the toner bottle control unit 307 suppresses the updating of the information on the remaining amount of the toner according to the toner usage amount used in the printing processing of step S412. That is, the updating processing of the information on the remaining amount of the toner of the IC chip and the toner information storage unit 302 is canceled.

Therefore, in a case where the reading of the information from the IC chip fails and the initial value of the remaining amount of the toner is initialized with the value different from the actual value, when writing to the IC chip is able to be performed again by the re-installation or the like of the toner bottle, the following is able to be suppressed. That is, it is possible to suppress the updating of the remaining amount of the toner of the toner of the IC chip with the value different from the original remaining amount of the toner obtained by subtracting the toner usage amount by the printing processing performed while the information of the IC chip is not able to be read from the initial value of the remaining amount of the toner initialized with the value different from the actual value.

In step S414, the device information control unit 304 stores the temporary identification information of the toner bottle and the toner usage amount in the toner information storage unit 302 through the DB access management unit 303. In step S415, the toner bottle control unit 307 checks whether the remaining amount of the toner of the installed toner bottle is zero, that is, whether the toner in the toner bottle is exhausted. In a case where the remaining amount of the toner of the toner bottle is zero, the processing proceeds to step S416, and in a case where the remaining amount of the toner of the toner bottle is not zero, the processing proceeds to step S417.

In step S416, the toner bottle control unit 307 instructs the toner remaining amount writing unit 310 to write information indicating that the remaining amount of the toner is zero (no remaining amount) as the information on the remaining amount of the toner in the IC chip of the toner bottle. In addition, even though the processing of step S416 is successful or fails, the processing proceeds to step S417.

In step S417, the device control unit 207 determines whether there is another process in the printing apparatus 102. In a case where there is no another process, the processing returns to step S411 and prepares for the processing of the print job. On the other hand, in a case where there is another process, the processing shown in FIGS. 4A and 4B are ended. In step S418, the toner bottle control unit 307 instructs each of the bottle identification information reading unit 311 and the toner remaining amount reading unit 312 to read the information of the IC chip included in the installed toner bottle.

Each of the bottle identification information reading unit 311 and the toner remaining amount reading unit 312 notifies the toner bottle control unit 307 of the read identification information of the toner bottle and the information on the remaining amount of the toner. The toner bottle control unit 307 receives the notification and notifies the device information control unit 304 of the identification information of the toner bottle and the information on the remaining amount of the toner.

The device information control unit 304 receiving the notification stores the identification information of the toner bottle and the information on the remaining amount of the toner in the toner information storage unit 302 through the DB access management unit 303. In addition, the toner bottle control unit 307 notifies the management information transmission unit 301 of the identification information of the toner bottle and the information on the remaining amount of the toner. The management information transmission unit 301 transmits the notification including the identification information of the toner bottle and the information on the remaining amount of the toner to the management server 106.

Steps S419 and S420 are the same as steps S411 and 412, and thus description thereof is omitted. In step S421, the toner remaining amount calculation unit 308 calculates the toner usage amount used in the printing processing of step S420. In addition, the toner remaining amount calculation unit 308 acquires the information on the remaining amount of the toner at that time from the toner information storage unit 302 through the toner bottle control unit 307 and the device information control unit 304.

The latest information on the remaining amount of the toner is obtained from the acquired information on the remaining amount of the toner and the toner usage amount by the current printing processing and the information on the remaining amount of the toner stored in the IC chip is overwritten and updated. In step S422, the toner bottle control unit 307 stores the following information in the toner information storage unit 302 through the device information control unit 304 and the DB access management unit 303.

That is, the toner bottle control unit 307 stores the identification information of the toner bottle read in step S403 and the latest information on the remaining amount of the toner obtained in step S421 in the toner information storage unit 302. In step S423, the device control unit 207 determines whether there is another process in the printing apparatus 102. In a case where there is no another process, the processing returns to step S419 and prepares for the processing of the print job. On the other hand, in a case where there is another process, the processing shown in FIGS. 4A and 4B are ended.

Second Exemplary Embodiment

In the first exemplary embodiment, in a case where the information stored in the IC chip is not able to be correctly read, the writing of the information to the IC chip is suppressed. On the other hand, in the present exemplary embodiment, processing of normally updating the information of the IC chip by using the regions of the fourteenth to sixteenth lines that are the reserve regions in a data structure of the IC chip shown in Table 2 will be described.

Specifically, in the processing of updating the information of the IC chip shown in FIGS. 4A and 4B, a case where the toner remaining amount reading unit 312 is not able to read the information on the remaining amount of the toner of the installed toner bottle in step S403 is considered. At this time, the toner bottle control unit 307 stores information using the reserve region of the IC chip through the toner remaining amount writing unit 310.

For example, date and time when recording is started after the information on the remaining amount is not able to be read is recorded in the fourteenth line. In addition, the last update date and time after the information on the remaining amount is not able to be read is recorded in the fifteenth line. In addition, an integration value of the toner usage amount used in the printing processing executed after the information on the remaining amount is not able to be read is recorded in the sixteenth line.

In the present exemplary embodiment, in a case where the toner bottle is installed, the printing apparatus 102 reads all pieces of the information from the first line to the sixteenth line of the toner information (Table 2) of the IC chip of the toner bottle. In a case where all pieces of the information are able to be read, the latest information on the remaining amount of the toner is calculated by using the integration value of the toner usage amount after the estimated remaining amount of the toner (%) in the bottle of the eleventh line and the information on the remaining amount of the sixteenth line are not able to be read. In addition, the estimated remaining amount of the toner (%) in the bottle of the eleventh line is updated. After updating, the information of the fourteenth to sixteenth lines is deleted.

Therefore, for example, when the toner bottle is installed again, in a case where the information is written in the fourteenth to sixteenth lines of the IC chip, it is possible to execute the above-described processing and update the estimated remaining amount of the toner (%) in the bottle of the eleventh line to a correct value.

Third Exemplary Embodiment

In the first exemplary embodiment, even in a case where the information of the IC chip of the toner bottle is not able to be correctly read, the print job is not rejected and is accepted. However, even in a case where the information of the IC chip is able to be correctly read, it may be better to suppress the execution of the print job and reject the print job in some cases.

For example, there is a case where a toner bottle having color information different from an original toner color is installed, a case where identification information of a toner bottle that is known to cause a problem in the printing apparatus 102 may be read, or the like. Therefore, in the present exemplary embodiment, in such a case, the execution of the print job is suppressed and the acceptance of the print job is not performed.

In the installed toner bottle, it is determined whether or not to suppress the print job by using specific identification information transferred from the management server 106. In addition, in addition to the identification information transferred from the management server 106, for example, a case where it is determined that a toner bottle manufacturer is unknown of a toner bottle from identification information of the toner bottle may also be set as an object of suppression of the execution of the print job.

In addition, in a case where the manufacturer is unknown, a message of contents such as "a toner bottle of which a manufacturer is unknown is installed. There is a danger that causes a critical problem in a case where this toner is used. Will you continue processing as it is?" is displayed through the user IF 305. In addition, the user may be enabled to select whether or not to suppress the execution of the print job. The printing apparatus 102 determines whether or not to suppress the execution of the print job according to the selection of the user.

In addition, in the first to third exemplary embodiments, the toner bottle has been described as an example of the consumable item, but the present invention is not limited thereto. For example, in a case where a storage device of an IC chip or the like is provided similarly to another other consumable item such as a toner cartridge, an ink tank, an ink bottle, or an ink cartridge and a remaining amount of a recording agent included in each of the consumable item is managed, the case is able to be applied to the present invention.

In addition, in the first to third exemplary embodiments, an image forming apparatus has been described as an example of the printing apparatus, but the present invention is not limited thereto. For example, the present invention is also able to be applied to a case where the printing apparatus is an apparatus that forms a three-dimensional object using a recording agent using a molding material or the like, a so-called 3D printer.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-185483, filed Sep. 26, 2017, which is hereby incorporated by reference wherein in its entirety.

What is claimed is:

1. A printing apparatus equipped with a consumable item including a recording agent used in the printing apparatus, the printing apparatus comprising:
a memory storing instructions; and
a processor executing the instructions causing the printing apparatus to:
read identification information of the consumable item recorded in a storage device included in the installed consumable item and information on a remaining amount of the recording agent;
transmit a notification including the identification information of the consumable item and the information on the remaining amount of the recording agent to the outside in a case where the reading of the information of the storage device included in the installed consumable item is successful; and
obtain a usage amount of the recording agent used in printing processing according to execution of the printing processing based on a print job and update the information on the remaining amount recorded in the storage device included in the installed consumable item according to the usage amount,
wherein, in a case where the reading of the information of the storage device included in the installed consumable item fails, the updating of the information on the remaining amount recorded in the storage device included in the consumable item, according to the usage amount of the recording agent used in the printing processing according to the execution of the printing processing based on the print job, which is received when the reading fails, is suppressed, and
wherein, in the case where the reading of the information of the storage device included in the installed consumable item fails, a notification including information indicating that the reading has failed is transmitted.

2. The printing apparatus according to claim 1, wherein the instructions further cause the printing apparatus to display a message prompting a replacement of the consumable item on a display screen of the printing apparatus in a case where a problem of the storage device included in the installed consumable item is detected in the reading of the information of the storage device included in the installed consumable item.

3. The printing apparatus according to claim 2, wherein the instructions further cause the printing apparatus to display a message prompting a reinstallation of the consumable item on the display screen, in a case where the problem is not detected and the reading of the information of the storage device included in the installed consumable item fails.

4. The printing apparatus according to claim 1, wherein, in a case where a problem of the storage device included in the installed consumable item is detected in the reading of the information of the storage device included in the installed consumable item, a notification including a first code indicating the problem as the information on the remaining amount is transmitted.

5. The printing apparatus according to claim 4, wherein, in a case where the problem is not detected and the reading of the information of the storage device included in the installed consumable item fails, a notification including a second code indicating that the reading has failed as the information on the remaining amount is transmitted, and
wherein the second code is different from the first code.

6. The printing apparatus according to claim 1, wherein, in a case where the installed consumable item is removed from the printing apparatus, a notification including the identification information of the removed consumable item and the information on the remaining amount of the recording agent included in the removed consumable item is transmitted.

7. The printing apparatus according to claim 1, wherein, in the case where the reading of the information of the storage device included in the installed consumable item fails, a notification including temporarily issued identification information as the identification information of the consumable item is transmitted.

8. The printing apparatus according to claim 1, wherein the consumable item is any one of a toner bottle, a toner cartridge, an ink tank, an ink bottle, and an ink cartridge.

9. The printing apparatus according to claim 1, wherein the printing apparatus is an apparatus that forms an image on a paper using a recording agent or an apparatus that forms a three-dimensional object using a recording agent.

10. The printing apparatus according to claim 1, wherein, in the case where the reading of the information of the storage device included in the installed consumable item fails, the transmitted notification includes the information indicating that the reading has failed as the information on the remaining amount.

11. A control method of a printing apparatus equipped with a consumable item including a recording agent used in the printing apparatus and including a reading unit that reads identification information of the consumable item recorded in a storage device included in the installed consumable item and information on a remaining amount of the recording agent, the control method comprising:

transmitting a notification including the identification information of the consumable item and the information on the remaining amount of the recording agent to the outside in a case where the reading of the information of the storage device included in the installed consumable item by the reading unit is successful; and obtaining the usage amount of the recording agent used in printing processing according to execution of the printing processing based on a print job and updating the information on the remaining amount recorded in the storage device included in the installed consumable item according to the usage amount, wherein, in a case where the reading of the information of the storage device included in the installed consumable item by the reading unit fails, the updating of the information on the remaining amount recorded in the storage device included in the consumable item, according to the usage amount of the recording agent used in the printing processing according to the execution of the printing processing based on the print job, which is received when the reading fails, is suppressed, and wherein in the case where the reading of the information of the storage device included in the installed consumable item by the reading unit fails, a notification including information indicating that the reading has failed is transmitted.

12. The control method according to claim 11, further comprising displaying a message prompting a replacement of the consumable item on a display screen of the printing apparatus in a case where a problem of the storage device included in the installed consumable item is detected by the reading unit.

13. The control method according to claim 12, wherein, in the displaying, in a case where the problem is not detected and the reading of the information of the storage device included in the installed consumable item by the reading unit fails, a message prompting a reinstallation of the consumable item is displayed on the display screen.

14. The control method according to claim 11, wherein in a case where a problem of the storage device included in the installed consumable item is detected by the reading unit, a notification including a first code indicating the problem as the information on the remaining amount is transmitted.

15. The control method according to claim 13, wherein in a case where the problem is not detected and the reading of the information of the storage device included in the installed consumable item by the reading unit fails, a notification including a second code indicating that the reading has failed as the information on the remaining amount is transmitted, and wherein the second code is different from the first code.

16. The control method according to claim 11, wherein, in the notifying, in a case where the installed consumable item is removed from the printing apparatus, a notification including the identification information of the removed consumable item and the information on the remaining amount of the recording agent included in the removed consumable item is transmitted.

17. The control method according to claim 11, wherein in the case where the reading of the information of the storage device included in the installed consumable item by the reading unit fails, a notification including temporarily issued identification information as the identification information of the consumable item is transmitted.

18. A non-transitory storage medium on which is stored a computer program for making a computer execute a method for a printing apparatus that is equipped with a consumable item including a recording agent used in the printing apparatus and including a reading unit that reads identification information of a consumable item recorded in a storage device included in the installed consumable item and information on the remaining amount of the recording agent, the method comprising:

transmitting a notification including the identification information of the consumable item and the information on the remaining amount of the recording agent to the outside in a case where the reading of the information of the storage device included in the installed consumable item by the reading unit is successful; and obtaining the usage amount of the recording agent used in printing processing according to execution of the printing processing based on a print job and updating the information on the remaining amount recorded in the storage device included in the installed consumable item according to the usage amount, wherein, in a case where the reading of the information of the storage device included in the installed consumable item by the reading unit fails, the updating of the information on the remaining amount recorded in the storage device included in the consumable item, according to the usage amount of the recording agent used in the printing processing according to the execution of the printing processing based on the print job, which is received when the reading fails, is suppressed, and wherein in the case where the reading of the information of the storage device included in the installed consumable item by the reading unit fails, a notification including information indicating that the reading has failed is transmitted.

* * * * *